(12) United States Patent
Eyer

(10) Patent No.: US 11,750,877 B2
(45) Date of Patent: *Sep. 5, 2023

(54) IDENTIFICATION OF SERVICES CONTAINING THE SAME OR EQUIVALENT CONTENT

(71) Applicant: Saturn Licensing LLC, New York, NY (US)

(72) Inventor: Mark Eyer, Woodinville, WA (US)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,464

(22) Filed: Mar. 7, 2022

(65) Prior Publication Data
US 2022/0408145 A1 Dec. 22, 2022

Related U.S. Application Data

(63) Continuation of application No. 16/911,754, filed on Jun. 25, 2020, now Pat. No. 11,303,953, which is a
(Continued)

(51) Int. Cl.
*H04N 21/434* (2011.01)
*H04N 21/438* (2011.01)
(Continued)

(52) U.S. Cl.
CPC ..... *H04N 21/4345* (2013.01); *H04N 21/4383* (2013.01); *H04N 21/44* (2013.01);
(Continued)

(58) Field of Classification Search
CPC ........... H04N 21/4345; H04N 21/4383; H04N 21/44; H04N 21/4622; H04N 21/4823; H04N 21/6112; H04N 21/84
See application file for complete search history.

(56) References Cited

U.S. PATENT DOCUMENTS

| 7,376,964 B1 | 5/2008 | Kim |
| 2002/0035726 A1 | 3/2002 | Corl |

(Continued)

FOREIGN PATENT DOCUMENTS

| AU | 2016 200768 A1 | 2/2016 |
| JP | 2014-78815 | 5/2014 |

OTHER PUBLICATIONS

International Search Report issued in International Patent Application No. PCT/US2017/060620 dated Jan. 23, 2018, 13 pages.
(Continued)

*Primary Examiner* — Mulugeta Mengesha
(74) *Attorney, Agent, or Firm* — Chris Kolefas

(57) ABSTRACT

Identification of services that carry the same or equivalent content. A reception apparatus includes circuitry configured receive first service information for a first service included in a first broadcast stream, and receive second service information for a second service included in a second broadcast stream. The first service is associated with a first virtual channel number and the second service is associated with a second virtual channel number. The circuitry is configured to determine whether the first service included in the first broadcast stream contains the same programming content as a service included in another broadcast stream based on the first service information. The first service information includes an identifier included in the second service information when the first service included in the first broadcast stream contains the same programming content as the second service included in the second broadcast stream.

20 Claims, 9 Drawing Sheets

Related U.S. Application Data continuation of application No. 16/015,817, filed on Jun. 22, 2018, now Pat. No. 10,728,611, which is a continuation of application No. 15/351,842, filed on Nov. 15, 2016, now Pat. No. 10,045,068.

(51) Int. Cl.

| | | |
|---|---|---|
| *H04N 21/482* | (2011.01) | |
| *H04N 21/61* | (2011.01) | |
| *H04N 21/44* | (2011.01) | |
| *H04N 21/462* | (2011.01) | |
| *H04N 21/84* | (2011.01) | |

(52) U.S. Cl.
CPC ..... *H04N 21/4622* (2013.01); *H04N 21/4823* (2013.01); *H04N 21/6112* (2013.01); *H04N 21/84* (2013.01)

(56) References Cited

U.S. PATENT DOCUMENTS

| | | | |
|---|---|---|---|
| 2013/0117795 A1 | 5/2013 | Durn | |
| 2013/0305289 A1 | 11/2013 | Patel et al. | |
| 2014/0189743 A1 | 7/2014 | Kennedy et al. | |
| 2014/0317662 A1 | 10/2014 | Oztaskent et al. | |
| 2015/0095948 A1 | 4/2015 | Kummer | |
| 2015/0237416 A1 | 8/2015 | Eyer | |
| 2016/0277778 A1* | 9/2016 | Kwon | H04N 21/615 |
| 2016/0359744 A1* | 12/2016 | Kwak | H04N 7/08 |
| 2017/0244924 A1* | 8/2017 | Shintani | H04N 21/4383 |
| 2017/0302992 A1* | 10/2017 | Kim | H04N 21/4384 |
| 2018/0227065 A1* | 8/2018 | Kitahara | H04N 21/4382 |

OTHER PUBLICATIONS

"Universal Mobile Telecommunications System (UMTS); LTE; Multimedia Broadcast/Multicast Service (MBMS); Protocols and codecs (3GPP TS 26.346 version 12.4.0 Release 12)", ETSI TS 126 346 V12.4.0 (Jan. 2015), 210 pp.
"ATSC Mobile DTV Standard: A/153 Part 10, Mobile Emergency Alert System (A/153 Part 10:2013); Doc. A/153 Part 10:2013, " Advanced Television Systems Committee, Mar. 11, 2013, 20 pp.
"ATSC Mobile DTV Standard: A/153 Part 9, Scalable Full Channel Mobile Mode (A/153 Part 9:2013), Doc. A/153 Part 9:2013," Advanced Television Systems Committee, Jul. 25, 2013, 371 pp.
European Office Action dated Oct. 9, 2019, in European Application No. 17872142.9, 46 pages.
"ATSC Standard A/153 Part 8—HE AAC Audio System Characteristics, Doc. A/153 Part 8:2012," Advanced Television Systems Committee, Dec. 18, 2012, 12 pp.
"ATSC Standard: A/153 Part 7 AVC and SVC Video System Characteristics, Doc. A/153 Part 7: 2012," Advanced Television Systems Committee, Jul. 4, 212, 22 pp.
"ATSC Mobile DTV Standard, Part 6—Service Protection, Document/ 153 Part 6: 2011," Advanced Television Systems Committee, Inc., May 23, 2011, 26 pp.
"ATSC-Mobile DTV Standard, Part 5—Application Framework, Document A/153 Part 5:2009," Advanced Television Systems Committee, Inc., Oct. 15, 2009, 20 pp.
"ATSC-Mobile DTV Standard, Part 4—Announcement, Document A/153 Part 4:2009," Advanced Television Systems Committee, Inc., Oct. 15, 2009, 40 pp.
"ATSC Mobile DTV Standard: A/153 Part 3, Service Multiplex and Transport Subsystem Characteristics, Doc. A/153 Part 3:2013," Advanced Television Systems Committee , Oct. 29, 2013, 80 pp.
"ATSC-Mobile DTV Standard, Part 2-RF/Transmission System Characteristics, Document A/153 Part 2:2011," Advanced Television Systems Committee , Inc., Oct. 7, 2011, 102 pp.
ATSC Mobile DTV Standard: A/153 Part 1, ATSC Mobile DTV System (A/153 Part 1:2013), Doc. A/153 Part 1:2013, Advanced Television Systems Committee, Mar. 11, 2013, 20 pp.
"OASIS: Common Alerting Protocol Version 1.2," OASIS Standard, Jul. 1, 2010, 47 pp.
"ATSC Proposed Standard: Service Announcement (A/332), Doc. S33-159r6," Advanced Television Systems Committee, Oct. 28, 2010, 34 pp.
"Digital Video Broadcasting (DVB); Frame structure channel coding and modulation for a second generation digital terrestrial television broadcasting system (DVB-T2)," ETSI EN 302 755 V1.41 (Jul. 2015), European Standard, Jul. 2015, 188 pp.
"ATSC Candidate Standard: Signaling, Delivery, Synchronization, and Error Protection (A/331), Doc. S33-174r5," Advanced Television Systems Committee, Sep. 21, 2016, 180 pp.
"ATSC Standard: Link-Layer Protocol (A/330), Doc. A/330:2016," Advanced Television Systems Committee, Sep. 19, 2016, 48 pp.
"ATSC Standard: Physical Layer Protocol (A/322), Doc. A/322:2016," Advanced Television Systems Committee, Sep. 7, 2016, 258 pp.
"ATSC Standard: A/321, System Discovery and Signaling, Doc. A/321:2016," Advanced Television Systems Committee, Mar. 23, 2016, 28 pp.
"ATSC Standard: Program and System Information Protocol for Terrestrial Broadcast and Cable, Doc. A65/2013," Advanced Television Systems Committee, Aug. 7, 2013, 142 pp.

\* cited by examiner

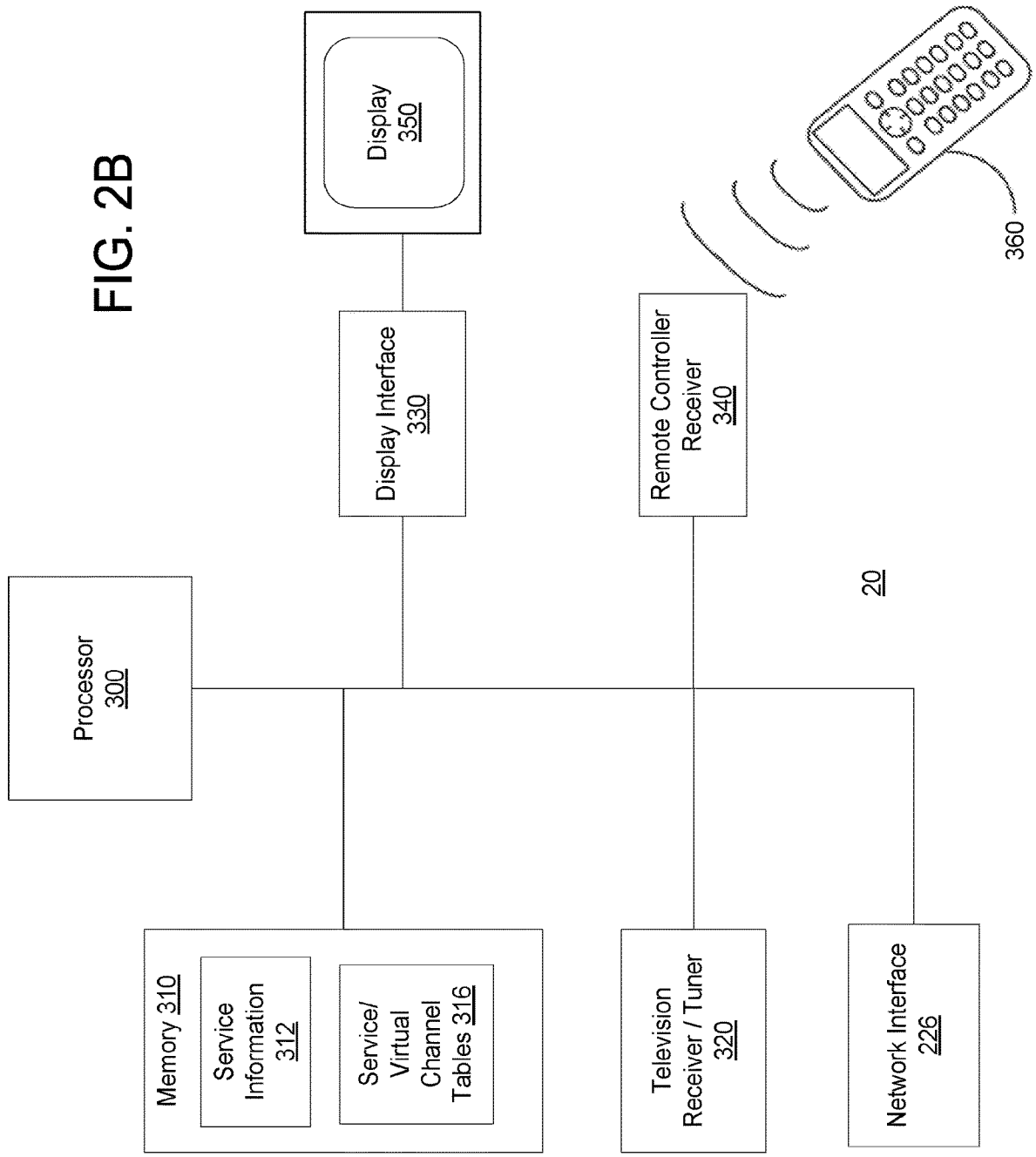

| Element or Attribute Name | | | Use | Data Type | Short Description |
|---|---|---|---|---|---|
| SLT | | | | | Root element of the SLT |
| | @bsid | | 1 | unsignedShort | Identifier of the entire Broadcast Stream. |
| | @sltCapabilities | | 0..1 | string | Required capabilities for decoding and meaningfully presenting the content for all the services in this SLT instance. |
| | sltInetUrl | | 0..N | anyURI | Base URL to acquire ESG or service layer signalling files available via broadband for services in this SLT. |
| | | @urlType | 1 | unsignedByte | Type of files available with this URL |
| | Service | | 1..N | | Service information |
| | | @serviceId | 1 | unsignedShort | Integer number that identifies this Service within the scope of this Broadcast area. |
| | | @sltSvcSeqNum | 1 | unsignedByte | Version of SLT service info for this service. |
| | | @protected | 0..1 | boolean | Indicates whether one or more components needed for meaningful presentation of this service are protected (e.g. encrypted). |
| | | @majorChannelNo | 0..1 | 1..999 | Major channel number of the service |
| | | @minorChannelNo | 0..1 | 1..999 | Minor channel number of the service |
| | | @serviceCategory | 1 | unsignedByte | Service category, coded per Error! Reference source not found. |
| | | @shortServiceName | 0..1 | string | Short name of the Service |
| | | @hidden | 0..1 | boolean | Indicates whether the service is intended for testing or proprietary use, and is not to be selected by ordinary TV receivers. |
| | | @broadbandAccessRequired | 0..1 | boolean | Indicates whether broadband access is required for a receiver to make a meaningful presentation of the service. |
| | | @svcCapabilities | 0..1 | string | Required capabilities for decoding and meaningfully presenting content of this service. |
| | | @simulcastTSID | 0..1 | unsignedShort | Identifier of an ATSC 1.0 broadcast stream carrying the same programming content |
| | | BroadcastSvcSignaling | 0..1 | | Location, protocol, address, id information for broadcast signaling |
| | | | @slsProtocol | 1 | unsignedByte | Protocol used to deliver the service layer signalling for this service |
| | | | @slsMajorProtocolVersion | 1 | unsignedByte | Major version number of protocol used to deliver Service Layer Signalling for this service. |
| | | | @slsMinorProtocolVersion | 1 | unsignedByte | Minor version number of protocol used to deliver Service Layer Signalling for this service. |
| | | | @slsPlpId | 0..1 | unsignedByte | PLP ID of the physical layer pipe carrying the broadcast SLS for this service. |
| | | | @slsDestinationIpAddress | 1 | string | A string containing the dotted-IPv4 destination address of the packets carrying broadcast SLS data for this service. |
| | | | @slsDestinationUdpPort | 1 | unsignedShort | Port number of the packets carrying broadcast SLS data for this service. |
| | | | @slsSourceIpAddress | 0..1 | string | A string containing the dotted-IPv4 source address of the packets carrying broadcast SLS data for this service. |
| | | svcInetUrl | | 0..N | anyURI | URL to access Internet signalling for this service |
| | | | @urlType | 1 | unsignedByte | Type of files available with this URL |

FIG. 6

| Name | Type | Category | Cardinality | Description | Data Type |
|---|---|---|---|---|---|
| ATSC3ServiceExtension | E1 | NM/TM | 1 | Additional information about ATSC 3.0 service.<br>Contains the following elements:<br>Icon<br>MajorChannelNum<br>MinorChannelNum | |
| Icon | E2 | NM/TM | 0..N | URL pointing to icon used to represent the service in ESG. Multiple URLs could be used to point to icons of different width and height or different representation formats.<br>Contains the following optional attributes:<br>MIMEType<br>width<br>height<br>dataSize | anyURI |
| MIMEType | A | NM/TM | 0..1 | The optional MIME type of the icon allowing receivers to preemptively ignore fetching image types they are not capable of presenting. | string |
| width | A | NM/TM | 0..1 | Width of the referenced image in pixels | unsignedInt |
| height | A | NM/TM | 0..1 | Height of the referenced image in pixels | unsignedInt |
| dataSize | A | NM/TM | 0..1 | Size of the image data in bytes. | unsignedInt |
| MajorChannelNum | E2 | NM/TM | 0..1 | Major channel number of the service. The language is expressed using built-in XML attribute 'xml:lang' with this element. | string |
| MinorChannelNum | E2 | NM/TM | 0..1 | Minor channel number of the service. The language is expressed using built-in XML attribute 'xml:lang' with this element. | string |
| RatingRegionTables | E2 | NM/TM | 0..1 | Rating Region Table. Syntax of RatingRegionTables shall be as specified in Annex of A/331. The contents of this element in the service announcement shall match those sent in the service signaling. | |
| simulcastTSID | E2 | NM/TM | 0..1 | ATSC 1.0 TSID associated with simulcast programming using the same major/minor channel number | unsignedInt |

FIG. 7

IDENTIFICATION OF SERVICES CONTAINING THE SAME OR EQUIVALENT CONTENT

CROSS REFERENCE TO RELATED APPLICATIONS

This application is a continuation of U.S. application Ser. No. 16/911,754, filed Jun. 25, 2020, which is a continuation of U.S. application Ser. No. 16/015,817, filed Jun. 22, 2018 (now U.S. Pat. No. 10,728,611, issued Jul. 28, 2020), which is a continuation of U.S. application Ser. No. 15/351,842, filed Nov. 15, 2016 (now U.S. Pat. No. 10,045,068, issued Aug. 7, 2018), the entire contents of both which are incorporated herein by reference.

TECHNICAL FIELD

The present disclosure relates to identifying the same or equivalent content provided in different services.

BACKGROUND

Television broadcasting has evolved from basic analogue terrestrial broadcast television to complex digital systems. Further, next generation broadcasting and/or other standards are expected to provide enhancements to the viewing experience. During a transition period from an existing standard to a next generation standard, a service provider may provide different versions of a service using the existing and next generation standards. However, benefits of the enhanced viewing experience may be missed if the availability of the version of the service provided using the next generation standard is not known.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art.

SUMMARY

According to an embodiment of the present disclosure, there is provided a reception apparatus including circuitry. The circuitry is configured to receive first service information for a first service included in a first broadcast stream. The first service is associated with a first virtual channel number. The circuitry is configured to receive second service information for a second service included in a second broadcast stream. The second service is associated with a second virtual channel number. The circuitry is configured to determine whether the first service included in the first broadcast stream contains the same programming content as a service included in another broadcast stream based on the first service information. The first service information includes an identifier included in the second service information when the first service included in the first broadcast stream contains the same programming content as the second service included in the second broadcast stream.

According to an embodiment of the present disclosure, there is provided a method of a reception apparatus for identifying services containing the same programming content. The method includes receiving, by circuitry of the reception apparatus, first service information for a first service included in a first broadcast stream. The first service is associated with a first virtual channel number. The method includes receiving, by the circuitry, second service information for a second service included in a second broadcast stream. The second service is associated with a second virtual channel number. The method further includes determining, by the circuitry, whether the first service included in the first broadcast stream contains the same programming content as a service included in another broadcast stream based on the first service information. The first service information includes an identifier included in the second service information when the first service included in the first broadcast stream contains the same programming content as the second service included in the second broadcast stream.

According to an embodiment of the present disclosure, there is provided a non-transitory computer-readable medium that stores instructions which, when executed by a computer, cause the computer to perform the method of the reception apparatus, as described above.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2B is a processor-centric block diagram of an exemplary reception apparatus;

FIG. 6 illustrates a service list table according to one embodiment;

FIG. 7 illustrates a portion of service guide data according to one embodiment.

DETAILED DESCRIPTION

Figure 1:
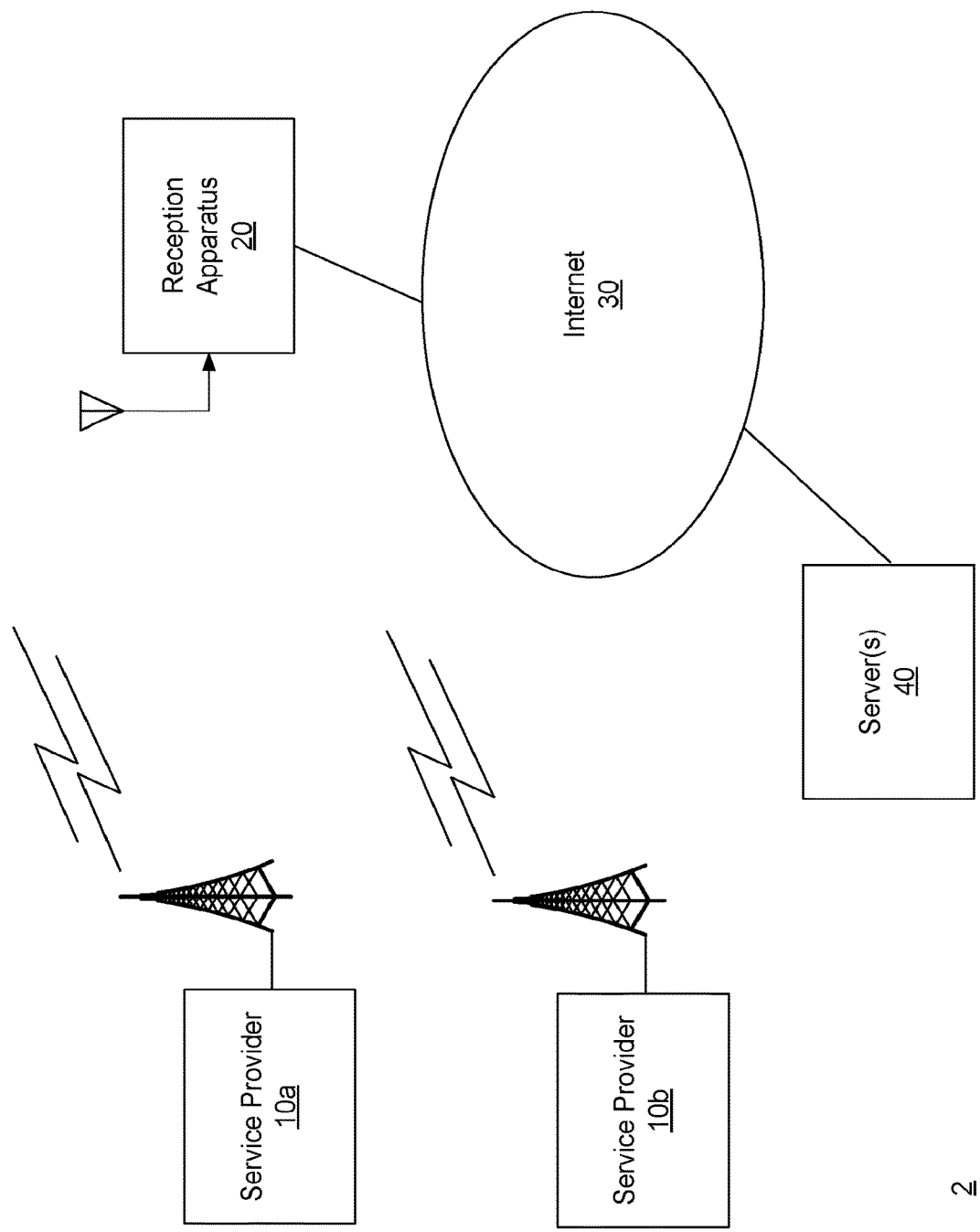
FIG. 1 illustrates an exemplary content distribution system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to identifying services that contain the same or equivalent content. Information provided with, or in association with, one of these services is used to identify another one of the services that contains the same content or equivalent content.

For example, during a transition between broadcasting systems, such as Advanced Television Systems Committee (ATSC) 1.0 to ATSC 3.0 broadcast systems, a broadcaster may begin broadcasting their programming services using ATSC 3.0 protocols before shutting off their ATSC 1.0 broadcast signal. The first receivers built to support the ATSC 3.0 system will also support ATSC 1.0 broadcasts.

Certain embodiments of the present disclosure are directed to a method whereby the broadcaster can positively identify the equivalence of programming services broadcast on both ATSC 1.0 and ATSC 3.0 broadcast emissions. This would allow a receiver to positively know that an ATSC 1.0 virtual channel found on one radio frequency carries the same programming content as an ATSC 3.0 service found on a different radio frequency. The user will therefore see the same programming on two channels, and more importantly could miss the benefits of the enhanced experience that may be offered on the ATSC 3.0 service. Such enhanced experiences could include ultra-high definition (UHD) resolution, advanced audio, interactivity, and advanced emergency alerts. By signaling the equivalence of programming services, the receiver can avoid offering ATSC 1.0 programming that is better presented as received from an ATSC 3.0 broadcast.

A service may contain content that includes audio and/or video content. Exemplary audio/video content includes television programming such as any coherent sequence of audio/video content such as those which would be interpreted as and reported in an electronic program guide (EPG) or electronic service guide (ESG) as a single television program, without regard for whether the content is a movie, sporting event, segment of a multi-part series, news broadcast, etc. The television programming may also be interpreted to encompass commercial advertising spots and other program-like content which may not be reported as a program in an EPG or ESG. Different services may be considered to be the same or equivalent, for example, when the services include the same television programming content and commercial spots or the same television programming content and different commercial spots (e.g., in the case the services are targeted towards different geographic regions).

The services are broadcast on different broadcast emissions according to certain embodiments. For example, one of the services is broadcast on an ATSC 1.0 broadcast emission and another one of the services containing the same or equivalent content is broadcast on a different type of ATSC broadcast emission (e.g., an ATSC 3.0 broadcast emission). ATSC 1.0 corresponds to A/53: ATSC Digital Television Standard (Jan. 3, 2007) and related standards such as ATSC Standard A/65: Program and System Information Protocol for Terrestrial Broadcast and Cable (Aug. 7, 2013), which are incorporated herein by reference in their entirety. See, for example, the ATSC.org website. ATSC 3.0 corresponds to ATSC Standard A/321: System Discovery and Signaling (Mar. 23, 2016), ATSC Standard A/322: Physical Layer Protocol (Sep. 7, 2016), ATSC Standard A/330: Link-Layer Protocol (Sep. 19, 2016), and related standards such as ATSC Candidate Standard A/331: Signaling, Delivery, Synchronization and Error Protection (Sep. 21, 2016), which are incorporated herein by reference in their entirety.

FIG. 1 is an exemplary content distribution system for distributing services to one or more reception apparatuses. The content distribution system 2 includes a plurality of broadcast signal sources (e.g., a first broadcast signal source 10a and a second broadcast signal source 10b), the one or more reception apparatus (e.g., a reception apparatus 20), and one or more servers 40. The reception apparatus 20 may access the one or more servers 40 via one or more communication networks such as the Internet 30.

The broadcast signal sources 10a, 10b, may correspond to a single service provider (e.g., ABC or CBS) that provides different versions of services containing the same or equivalent content (e.g., television programming content) to the reception apparatus 20 via a terrestrial broadcast according to one embodiment. The broadcast signal sources 10a, 10b may, alternatively, correspond to different service providers that provide different services containing different content to the reception apparatus 20.

In other embodiments, the broadcast signal sources 10a, 10b provide the services via at least one of a satellite broadcast, a cable television transmission, the terrestrial television broadcast, cellular network, and data communication network such as a local area network (LAN), wide area network (WAN), or the Internet 30. The services provided by the broadcast signal sources 10a, 10b include one or more television programs, without regard to whether the content is a movie, sporting event, segment of a multi-part series, news broadcast, etc. As described above, the services may also include advertisements, infomercials, and other program-like content which may not be reported as a program in an EPG or ESG. The broadcast signal sources 10a, 10b may also provide services containing content that is only audio or only video.

In one embodiment, the broadcast signal sources 10a, 10b include a transmission apparatus with a transmitter that is configured to transmit one or more services to the reception apparatus 20. The transmitter may include a source encoder, a channel encoder, and a modulator. The source encoder may include data, audio, and video encoders to compress the audio, video, signaling, control or other data received from a source. The channel encoder may randomize, interlace, channel code, and frame map the compressed and signaling data. For example, the channel encoder may include a frame builder that forms many data cells into sequences to be conveyed on OFDM (Orthogonal frequency-division multiplexing) symbols. The modulator (multiplexer) converts the processed digital data into modulation symbols, which can be, for example OFDM symbols (e.g., in the case of the ATSC 3.0 standard). The multiplexed data is then passed to an inverse fast Fourier transformer (TFFT) which transforms a frequency domain signal into a time domain signal. The time domain signal is fed to a guard insertion module for generating a guard interval (GI) between symbols and then to a digital to analog (D/A) converter. An antenna may perform up-conversion, RF amplification and over-the air broadcasting. Some of the components of the transmission apparatus or the reception apparatus 20 may not be necessary in certain embodiments. For example, the antennas are not required when the transmission system is not over-the-air but over cable. Details of an exemplary OFDM transmitter and receiver may be found, for example, in the DVB-T2 standard (ETSI EN 302 755), which is incorporated herein by reference in its entirety, ATSC Standard A/322, and ATSC Standard A/321.

The reception apparatus 20 may be a television set, mobile handset, personal video recorder, set-top box, or other device configured to receive the services, containing the content, from the broadcast signal sources 10a, 10b. In one embodiment, each reception apparatus 20 includes an antenna to receive the services. The reception apparatus 20 includes reception circuitry, as illustrated for example in FIG. 2A. The reception apparatus 20 may also be included in a vehicle or a computer. The reception apparatus 20 is configured to process the services provided by the broadcast signal sources 10a, 10b and display the content contained in the services on a display (e.g., a liquid crystal or organic light-emitting diode display), for example the display 350 illustrated in FIG. 2B, or access the content (e.g., for recording). The display 350 may be a display panel that is an integral part of the reception apparatus 20 such as a television set. Alternatively, the display 350 may be external to the reception apparatus 20 such as a television set connected to a set top box.

The one or more servers 40, in certain embodiments, may include a signaling server, an electronic service guide server, a service usage data gathering report server, an emergency information server, an application server, an application manifest server, or other data servers.

The signaling server may be a Service Layer Signaling server, as specified in ATSC Candidate Standard A/331 "Signaling, Delivery, Synchronization, and Error Protection." The Service Layer Signaling server provides access to the Service Layer Signaling, as defined in Section 7 of A/331. The electronic service guide server may provide access to service guide data, as specified in ATSC Candidate Standard A/332: Service Announcement (Nov. 24, 2015), which is incorporated herein by reference in its entirety.

The application server may store one or more applications to support app-based enhancements to a linear service (e.g., television program). In one embodiment, the application is an HTML5 app that can be executed by a browser in the reception apparatus 20. The app-based enhancement may be an app that runs in the background and manages the insertion of targeted ads or a collection of apps that provide an interactive viewing experience to enhance the audio/video program. In one embodiment, the application is executed in synchronization with the display of the content.

The emergency information server may store emergency alert information (e.g., a message based on CAP (Common Alerting Protocol) message). The OASIS CAP standard (Common Alerting Protocol Version 1.2, 1 Jul. 2010), is incorporated herein by reference in its entirety. The application manifest server may store a manifest file that identifies application packages (e.g., an HTML5 app and images).

Figure 2A:
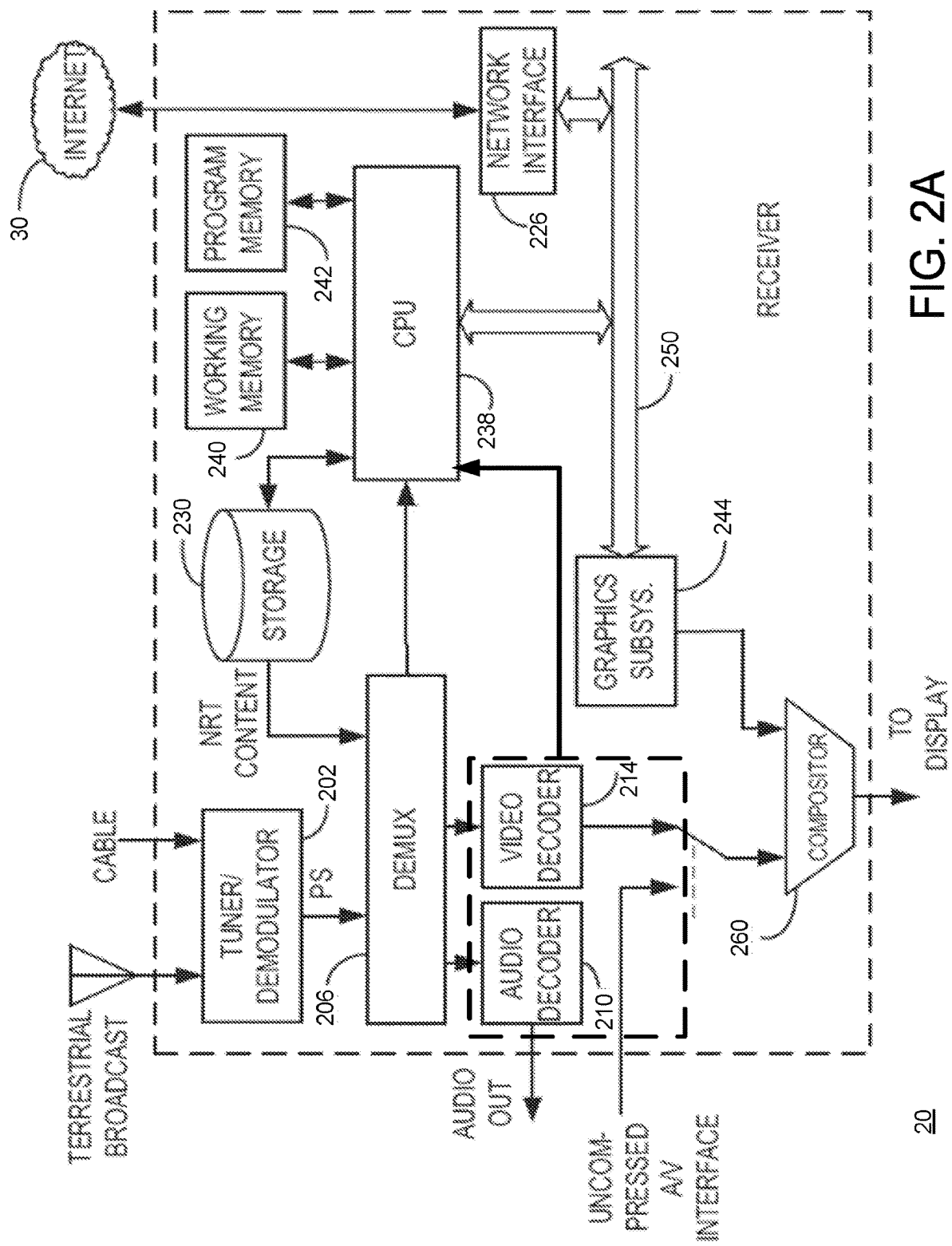
FIG. 2A is a block diagram of an exemplary reception apparatus.

FIG. 2A illustrates an embodiment of the reception apparatus 20. The reception apparatus 20 may be implemented in or connected to a fixed device such as a television set or desktop computer, or a mobile device such as a device on a vehicle, a portable computer, smart phone, tablet, etc. In certain embodiments, the reception apparatus 20 is a digital television receiver device that may be incorporated into a television set or a set top box connected to the television set.

The reception apparatus 20 includes one or more tuner/demodulators 202, each of which is configured to receive services provided by service providers via a terrestrial broadcast or a cable television transmission. The reception apparatus 20 may also, or alternatively, receive a service from a satellite broadcast. In one embodiment, the reception apparatus 20 includes a different tuner/demodulator 202 for each type of broadcast emission or signal type that is receivable by the reception apparatus 20. For example, the reception apparatus 20 includes one tuner/demodulator 202 to receive an ATSC 1.0 broadcast emission and a second tuner/demodulator 202 to receive another type of ATSC broadcast emission (e.g., an ATSC 2.0 or ATSC 3.0 broadcast emission).

The tuner/demodulator 202 receives, for example, a packet stream (PS) such as a transport stream (TS) or IP packet stream, which is demultiplexed by the demultiplexer 206 into audio and video (A/V) streams. Exemplary IP packet streams are described in the ATSC Mobile DTV standard ATSC-M/H (A/153), the Enhanced Multicast Multimedia Broadcast (eMBMS) standard 3GPP: TS 26.346 V12.4.0 (2014-12), "3rd Generation Partnership Project; Technical Specification Group Services and System Aspects; Multimedia Broadcast/Multicast Service (MBMS); Protocols and codecs (Release 12), which is incorporated by reference in its entirety, ATSC Standard A/322, and ATSC Standard A/330. The audio is decoded by an audio decoder 210 and the video is decoded by a video decoder 214.

Further, uncompressed A/V data may be received via an uncompressed A/V interface (e.g., a HDMI interface) that can be selectively utilized. The uncompressed A/V data may be received from a set-top box, digital video recorder, DVD player, or any other consumer electronics device connected to the reception apparatus 20 via the uncompressed A/V interface.

In addition to the content contained in a service, the IP packet stream may include caption data, lower layer signaling (LLS), service guide data, alternate content (e.g., alternate advertisements), broadcast and/or other applications, metadata, etc. One or more of the content, the caption data, LLS, service guide data, the alternate content, the broadcast and/or other applications, metadata, etc. may also be receivable via the Internet 30 and a network interface 226.

A storage unit 230, such as a hard disc drive or solid state memory, is provided to store the alternate content or other recorded content. The alternate or stored content can be played by demultiplexing the content stored in the storage unit 230 by the demultiplexer 206 in a manner similar to that of other sources of content. The storage unit 230 may also store downloaded applications (e.g., downloaded from the Internet) in certain embodiments.

The reception apparatus 20 generally operates under control of at least one processor, such as the CPU 238, which is coupled to a working memory 240, program memory 242, and a graphics subsystem 244 via one or more buses (e.g., bus 250). The CPU 238 receives closed caption data from the demultiplexer 206 as well as any other information such as EPGs or ESGs used for rendering graphics, and passes the information to the graphics subsystem 244. Graphics outputted by the graphics subsystem 244 are combined with video images by the compositor and video interface 260 to produce an output suitable for display on a video display.

Further, the CPU 238 operates to carry out functions of the reception apparatus 20 including, for example, one or a combination of extraction of service information used to determine whether services contain the same or equivalent content, storage of the extracted service information for future reference, determination of whether services contain the same or equivalent content, etc.

Although not illustrated in FIG. 2A, the CPU 238 may be coupled to any one or a combination of the reception apparatus 20 resources to centralize control of one or more functions. In one embodiment, the CPU 238 also operates to oversee control of the reception apparatus 20 including the one or more tuner/demodulators 202 and other television resources.

A more processor-centric view of the reception apparatus 20 is illustrated in FIG. 2B. Memory and storage 230, 240, and 242 are depicted collectively as memory 310. Further, a processor 300 includes one or more processing units such as CPU 238. Similarly, the various tuners, demodulators, decoders, etc., that initially process digital television signals are collectively depicted as television receiver/tuner 320. The reception apparatus 20 further includes a remote controller 360 which communicates with a remote controller receiver interface 340. Additionally, the display 350 is connected to a display interface 330, which includes for example the uncompressed A/V interface and/or compositor 260, and is either a display integral to the reception apparatus 20 as in a television set or a connected display device as in the case where the reception apparatus 20 is integrated into a set-top box.

Memory 310 contains various functional program modules and data. The memory 310 stores the data used by the reception apparatus 20. The memory 310 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. The term "non-transitory" is a limitation of the medium itself (i.e., tangible, not a signal) as opposed to a limitation on data storage persistency (e.g., RAM vs. ROM).

The memory may store service information 312 used to determine whether services contain the same or equivalent content and any service and/or virtual channel tables 316 to facilitate to tuning to receivable services. The service information is stored in the service/and/or virtual channel tables according to certain embodiments.

Figure 3:
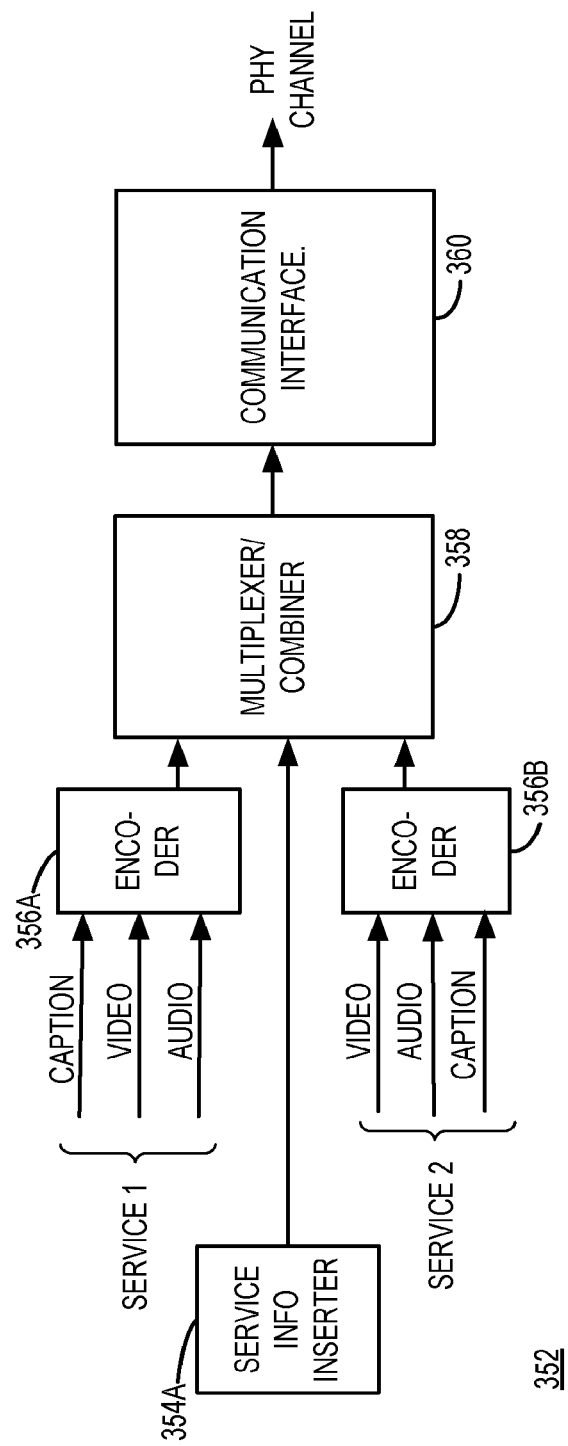
FIG. 3 illustrates an exemplary information providing apparatus.

FIG. 3 is a basic diagram of an exemplary information providing apparatus 352, which for example is utilized by one of the broadcast signal sources 10a, 10b. Generally speaking, a single broadcast signal source may provide a service including a plurality of content, (e.g., multiple programs), over one or more transport streams or IP packet streams. For example, audio, video, and caption data for service 1 are provided to an encoder 356A while audio, video, and caption data for service 2 are provided to an encoder 356B. A transport stream multiplexer/combiner 358 receives the outputs from the encoders 356A, 356B and provides an output that can be distributed via a physical channel medium such as a terrestrial, cable, or satellite broadcast. A communication interface 360 (e.g., a broadcast transmitter) distributes the output from the transport stream multiplexer/combiner 358 via the physical channel medium.

In certain embodiments, the information providing apparatus 352 includes a service information inserter 354A. The service information inserter 354A is configured to insert the service information into a broadcast stream, for example in a service list table (SLT) or a service fragment, as further described below.

Figure 4:
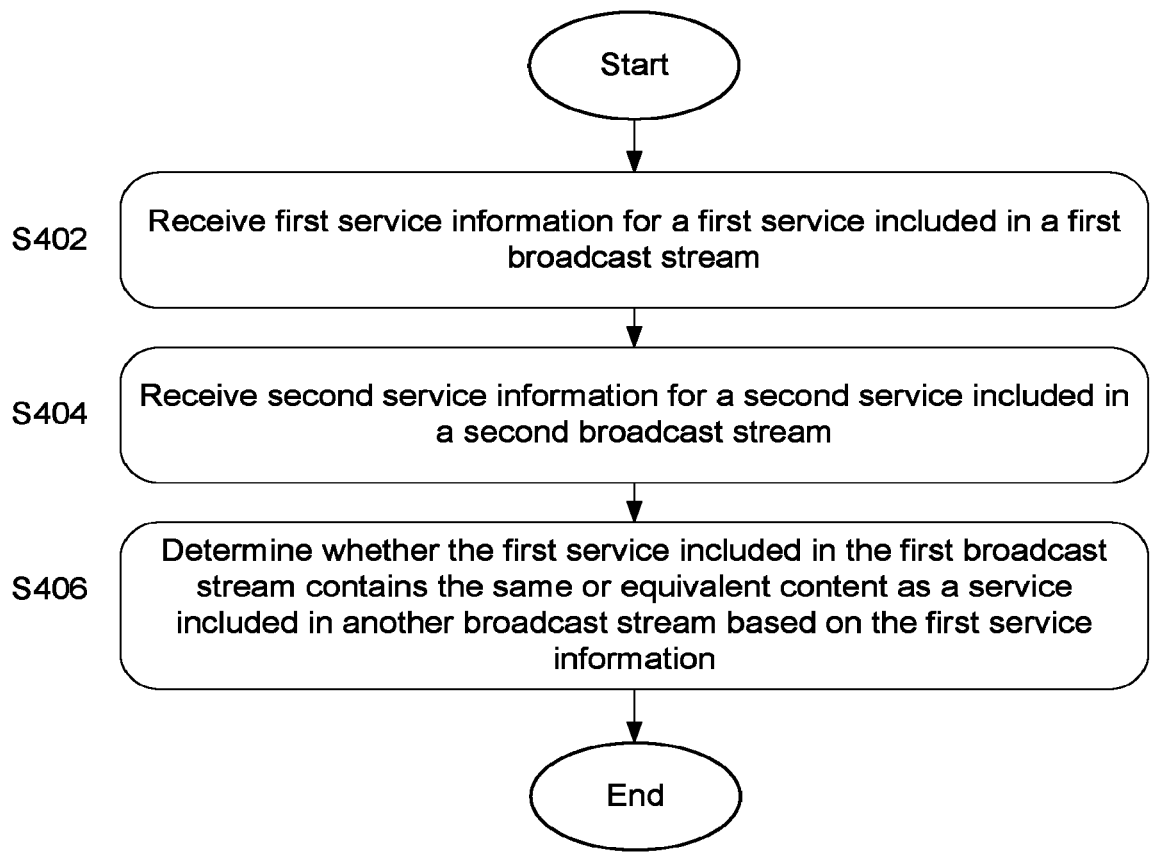
FIG. 4 illustrates an exemplary method for determining whether services include the same or equivalent content.

FIG. 4 provides an overview of an exemplary method of the reception apparatus 20 for determining whether services receivable by the reception apparatus 20 include the same or equivalent content. The determination may be used, for example, to select which service contains content to present to a user (e.g., a viewer or listener) or to record.

In step S402, the reception apparatus 20 receives first service information for a first service included in a first broadcast stream. The first broadcast stream may further include one or more additional services. Each of the first service and any additional services included in the first broadcast stream is associated with a different virtual channel number.

The first service information is included in the first broadcast stream according to one embodiment. For example, the first service information may be included in a SLT or a service fragment of service guide data, when the first broadcast stream is provided in an ATSC 3.0 broadcast emission, as further described below.

In step S404, the reception apparatus 20 receives second service information for a second service included in a second broadcast stream. The second broadcast stream may further include one or more additional services. Each of the second service and any additional services included in the second broadcast stream is associated with a different virtual channel number. A service included in the second broadcast stream may be associated with a virtual channel number that is also associated with a service included in the first broadcast stream. For example, when the same or equivalent content are provided on services included in ATSC 1.0 and 3.0 broadcast emissions. However, such services need not be associated with the same virtual channel number in certain embodiments.

The second service information is included in the second broadcast stream according to one embodiment. For example, the second service information is included in MPEG-2 Systems Program Specific Information (PSI) data of an MPEG transport stream and/or Program and System Information Protocol (PSIP) data, when the second broadcast stream is provided in an ATSC 1.0 broadcast emission. An example of the PSIP data is described in ATSC Standard A/65: Program and System Information Protocol for Terrestrial Broadcast and Cable. The PSIP data includes, for example, a system time table (STT), master guide table (MGT), rating region table (RTT), and virtual channel table (VCT). In another example, the second service information is included in an SLT or service fragment of service guide data for the second broadcast stream when the second broadcast stream is provided in an ATSC 3.0 broadcast emission.

The first and second service information may be extracted from the first and second broadcast streams when the respective broadcast streams are received by the reception apparatus 20. For example, the first and second broadcast streams may be received during a channel scan by the reception apparatus 20 to identify receivable channels and/or update information on the receivable channels, or when the channel is selected for presentation to a user.

The reception apparatus 20 determines, in step S406, whether the first service included in the first broadcast stream contains the same or equivalent content as a service included in another broadcast stream based on the received first service information, or the received first and second service information. This determination may be made by the reception apparatus 20 based on whether the first service in the first broadcast stream is associated with a service included in another broadcast stream, such as the second service in the second broadcast stream.

In one embodiment, the first service information indicates whether the first service included in the first broadcast stream contains the same or equivalent content as a service included in another broadcast stream. For example, the first service information includes, or is otherwise associated with, an identifier of the second broadcast stream. The identifier may be a transport stream identifier (TSID) in the case of an ATSC 1.0 broadcast emission or a broadcast stream identifier (BSID) in the case of an ATSC 3.0 broadcast emission. The TSID may be extracted from a Transport Stream ID parameter included in the MPEG-2 PSI data of an MPEG transport stream. In another embodiment, the first and second services may simply be associated with the same identifier. For example the TSID for the ATSC 1.0 broadcast emission and the BSID for the ATSC 3.0 broadcast emission may be set to the same value when they include services containing the same or equivalent content. Further, in certain embodiments, the first service information may include identifiers for a plurality of broadcast streams and/or services containing the same or equivalent content.

Figure 5:
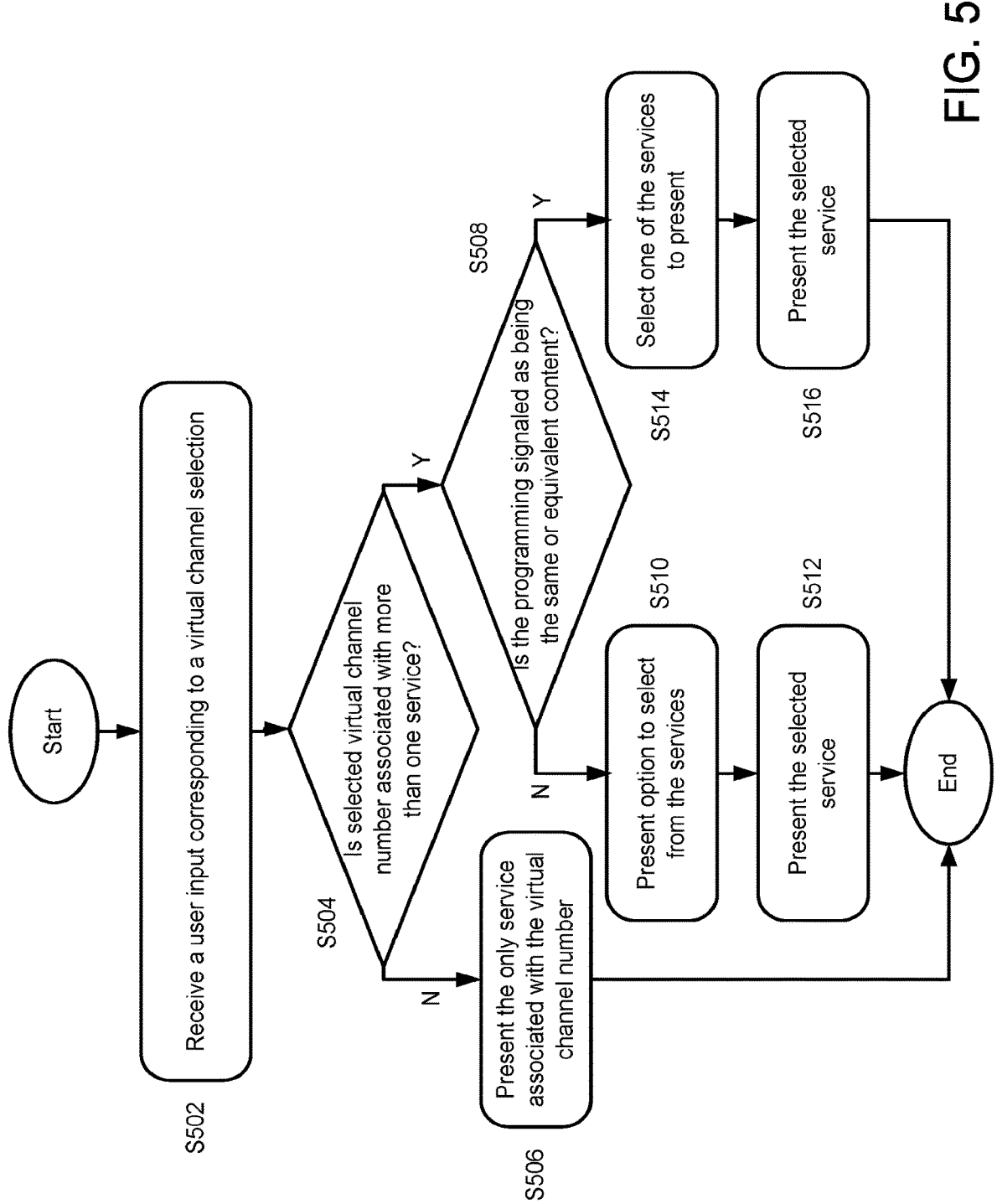
FIG. 5 illustrates an exemplary method for selecting a service to be presented to a user.

FIG. 5 provides an exemplary method of the reception apparatus 20 for selecting a service containing content to be presented to a user or otherwise accessed (e.g., for recording). The service is selected based, at least in part, on whether services included in different broadcast streams contain the same or equivalent content.

In one embodiment, the different broadcast streams include a first broadcast stream that is broadcast on an ATSC 3.0 broadcast emission and a second broadcast stream that is broadcast on an ATSC 1.0 broadcast emission. However, the first and second broadcast streams may be provided using other different types of broadcast emissions, in different formats, using different transmission mediums, for different geographic regions, etc.

In step S502, the reception apparatus 20 (e.g., remote controller receiver 340) receives a user input that corresponds to a virtual channel selection. The user input may correspond to a specific virtual channel number entered by a user via a remote control, a next virtual channel number corresponding to a channel up/down command, or a virtual channel number corresponding to a program or channel selected by a user via an electronic service or program guide.

The circuitry of the reception apparatus 20 determines the virtual channel number corresponding to the virtual channel selection. For example, the circuitry determines the virtual channel number based on the numbers entered by the user via the remote control, by determining the next virtual channel that is receivable by the reception apparatus 20 with reference to a virtual channel table or service list table stored in a memory of the reception apparatus 20, or by referring to the virtual channel number indicated by the electronic service or program guide for the selected program or channel.

In step S504, the reception apparatus 20 optionally determines whether the selected virtual channel number is associated with more than one service. In one embodiment, when the selected virtual channel number is only associated with one service, the service is presented to the user, or otherwise accessed, in step S506. In another embodiment, the reception apparatus 20 further determines whether the one service contains the same or equivalent content as another service irrespective of which virtual channel number the other service is associated with, for example using a process similar to step S508 (e.g., based on whether service information for the one service or any other services indicates an association between the one service and another service).

When the selected virtual channel number is associated with more than one service, the reception apparatus 20 makes a further determination, in step S508, as to whether the services contain the same or equivalent content. For example, the reception apparatus 20 determines if programming is signaled as being the same or equivalent content. The reception apparatus 20 makes this determination because, in certain embodiments, the reception apparatus 20 cannot positively know that content carried in one service (e.g., an ATSC 3.0 service) is definitely the same as, or equivalent to, content found in another service (e.g., an ATSC 1.0 service) even if the major/minor channel numbers are equivalent. For example, when the same or equivalent content is broadcast on both ATSC 1.0 and ATSC 3.0 physical emissions in the same service area, the reception apparatus 20 favors presentation of the content contained in a service delivered in the ATSC 3.0 broadcast emission over the ATSC 1.0 broadcast emission, according to certain embodiments. This is the case because ATSC 3.0 offers, for example, a more robust physical layer, more efficient codecs, the possibility of higher resolution (e.g., UHD) and frame rates, immersive audio, interactivity, and advanced emergency alerting.

More than one service carrying completely different programming content may be associated with the same virtual channel number when, for example, the location of the reception apparatus 20 allows it to receive broadcast streams for different geographic regions or when a broadcaster broadcasts different versions of a service (e.g., in the case of transitioning from ATSC 1.0 to 3.0) in different broadcast emissions.

In certain embodiments, the reception apparatus 20 determines whether the services associated with the same channel contain the same, or equivalent, content based on signaling provided with one of the services. Without this signaling, users may enjoy a service delivered on a broadcast ATSC 1.0 emission without knowing that they are missing the benefits of an ATSC 3.0 emission which include such things as UHD resolution, immersive audio, interactivity, etc. Broadcasters are expected to prefer that users enjoy the ATSC 3.0 experience because it may contain interactive experiences that may be revenue generators for them. Users will better enjoy the broadcaster's program in the ATSC 3.0 format.

The determination of whether services include the same or equivalent content may be made based on whether service information for any of the services indicates an association with another one of the services. In one embodiment, the reception apparatus 20 determines whether the services associated with the same channel contain the same, or equivalent, content based on whether a transport identifier is provided with one of the services. For example, when ATSC 1.0 and 3.0 services both contain the same, or equivalent, content, a transport identifier identifying the broadcast emission of the ATSC 1.0 service is provided with the ATSC 3.0 service. The transport identifier may be extracted from a SLT or service layer signaling fragment, as further described below. The extracted transport identifier is stored in a memory of the reception apparatus 20 for example, in a local service list table or local service guide data. The local service list table may be used by the reception apparatus 20 to facilitate tuning to selected services.

If the reception apparatus 20 determines that none of the services include the same or equivalent content, the reception apparatus 20 may present an option for a user to select from the services in step S510. For example, the reception apparatus 20 outputs a service selection interface to the user. The reception apparatus 20 presents the selected service in step S512.

If the reception apparatus 20 determines that services include the same or equivalent content, the reception apparatus 20 selects one of the services to present in step S514. For example, the reception apparatus 20 selects the more advanced version of the service (e.g., an ATSC 3.0 service over an ATSC 1.0-service) or a service included in a broadcast emission with the best signal (e.g., best signal to noise ratio). In step S514, the reception apparatus 20 presents the service selected in step S514.

The reception apparatus 20 according to one embodiment is capable of receiving different versions of a service, for example ATSC 1.0 and ATSC 3.0 broadcast services that both contain the same or equivalent content. The reception apparatus 20 uses information (e.g., one or more signaling parameters) provided with, or separately from (e.g., from a Service Layer Signaling server), the ATSC 3.0 broadcast services to improve a viewer's television watching experience. As an example, during a channel scan, such a dual-protocol-capable receiver might encounter an ATSC 1.0 signal associated with a TSID value 0x12EE at some radio carrier frequency, providing content on a virtual channel labeled "7.1." Continuing the channel scan, the reception apparatus 20 may encounter an ATSC 3.0 signal at a different radio carrier frequency. There, the reception apparatus 20 may discover a service identified as "7.1" and having one or more signaling parameters (e.g., a value of simulcast TSID of 0x12EE). The reception apparatus 20 then knows that if the viewer selects channel "7.1," it should, in one embodiment, preferentially present the ATSC 3.0 version of that service, or notify the viewer of the availability of both versions of the service. If the simulcastTSID indication is not present, the reception apparatus 20 may be expected to present both of the services associated with channel "7.1" to the viewer (e.g., allow both to be viewed when sequencing through the channels using the "channel up" button on the remote, or if "7.1" is directly entered, ask the user to make a choice between the two options), when it does not have any assurance that the content is identical, or equivalent. The reception apparatus 20 may present both of the services by presenting the viewer with an option to select one of the services.

In certain embodiments, the services containing the same or equivalent content may be provided using the same protocol (e.g., transmission scheme and/or format). For example, two or more of the services containing the same content may be broadcast on an ATSC 3.0 broadcast emission. Identification of the two or more services containing the same content and provided using the same transmission scheme or format is useful for example when the same content is contained in services provided by services providers in different regions that are both receivable by the reception apparatus. In this case the one or more signaling parameters may include a simulcastBSID that identifies a BSID value of the other broadcast stream that contains the same or equivalent content.

In one embodiment, the service information (e.g., the first service information) is included in a service list table (SLT). The SLT includes information used in a channel scan that allows the reception apparatus 20 to build a list of the services that can be received by the reception apparatus 20, with the channel name and channel number associated with each service. In addition, the SLT includes bootstrap information used by the reception apparatus 20 to discover the service layer signaling (SLS) for each service. The SLT supports channel scans and service acquisition by including the following information about each service in the broadcast stream: information used in the presentation of a service list that is meaningful to users and that can support initial service selection via channel number or up/down selection and information used to locate the SLS for each service listed.

An example of the SLT is defined in ATSC A/331. In ATSC A/331, the SLT lists the services available. The SLT is transported on a particular Low Level Signaling (LLS) stream. The definition of each service identifies its major/minor channel number. The function and use of the SLT is similar to the Program and System Information Protocol (PSIP) as defined in the ATSC Standard A/65. The SLT also identifies the Broadcast Stream Identifier (BSID) associated with the broadcast stream and RF emission. The BSID is roughly analogous to the Transport Stream Identifier (TSID) found in the MPEG-2 Systems Program Association Table (PAT). The PAT is defined in ISO/IEC 13818-1 MPEG-2 Systems (Fifth edition, Jul. 1, 2015), which is incorporated by reference in its entirety.

The SLT allows the reception apparatus 20 to build a list of services that it can receive. As defined in ATSC A/331, the SLT supports rapid channel scans and service acquisition by including the following information about each service in the broadcast stream: (1) information necessary to allow the presentation of a service list that is meaningful to viewers and that can support initial service selection via channel number or up/down selection; and (2) information necessary to locate SLS for each service listed. The SLT includes, for each service included in the broadcast stream, information such as a major channel number of the respective service (e.g., an integer in the range of 1 to 999), a minor channel number (e.g., an integer in the range of 1 to 999), a service category that indicates a category of the respective service (e.g., a linear A/V service, a linear audio only service, an app-based service, ESG service [program guide], EAS service [emergency alert], etc.), and, a short name of the respective service (e.g., when the respective service is intended to be selected by viewers).

In one embodiment, the service category may indicate that the respective service contains content that is the same or equivalent to content contained in a service included in another broadcast stream, for example broadcast in an ATSC 1.0 broadcast emission or another ATSC 3.0 broadcast emission. In another embodiment, different service categories may indicate when the respective service contains content that is the same, or equivalent, to content contained in a service included in another broadcast stream broadcast in an ATSC 1.0 broadcast emission or ATSC 3.0 broadcast emission.

In one embodiment, a new signaling element is added in the part of the ATSC 3.0 broadcast known as the LLS. The LLS includes the SLT, which lists characteristics of the various ATSC 3.0 services offered in that part of the ATSC 3.0 broadcast stream. The information provided in the ATSC 3.0 SLT is analogous to information found in the ATSC 1.0 VCT defined in ATSC A/65 and includes a short channel name (e.g., "KABC") and major/minor channel number (e.g., 4.1).

A signaling element, which may be called simulcastTSID, is included as an optional element in the SLT according to certain embodiments. For example, simulcastTSID, as illustrated in FIG. 6, when present references the TSID value of an ATSC 1.0 broadcast emission carrying the same, or equivalent, programming content on the virtual channel identified with majorChannelNo and minorChannelNo as is being broadcast in this ATSC 3.0 Service. The TSID, in one embodiment, is as specified in ISO/IEC 13818-1 (MPEG-2 Systems) and as used in ATSC A/65. In one embodiment, when not present, the programming content on this service is not associated with any ATSC 1.0 virtual channel in the local broadcast area. The simulcastTSID is a 16-bit number in one embodiment.

The simulcastTSID is inserted into a service fragment for a service guide according one embodiment. The service fragment includes information about services and content included in a broadcast stream and is used to announce those services, for example to enable an on-screen Service Guide for viewers to select and discover the services provided in the broadcast stream. An example of the service fragment is described in ATSC A/332, "Service Announcement."

The service fragment may include several elements such as a service description, service genre, and service-level private extensions. The service-level private extensions may include additional elements such as a service icon (e.g., a URL pointing to an icon representing the service in the ESG), service major channel number, service minor channel number, and rating region tables. In one embodiment, the simulcastTSID is added to the PrivateExt element of the ATSC 3.0 service-level private extensions of the service fragment, as illustrated in FIG. 7.

In certain embodiments, inclusion of the simulcastTSID in the service fragment allows the reception apparatus 20 to determine whether multiple services contain the same or equivalent content on a per content basis (e.g., on a per television program basis).

The service information may further include information for identifying the specific service in a broadcast stream associated with the simulcastTSID in certain embodiments. For example, the service information identifying the specific service may include a service identifier (e.g., a source identifier or short name of the virtual channel defined in ATSC A/65) or a major/minor channel number.

Figure 8:
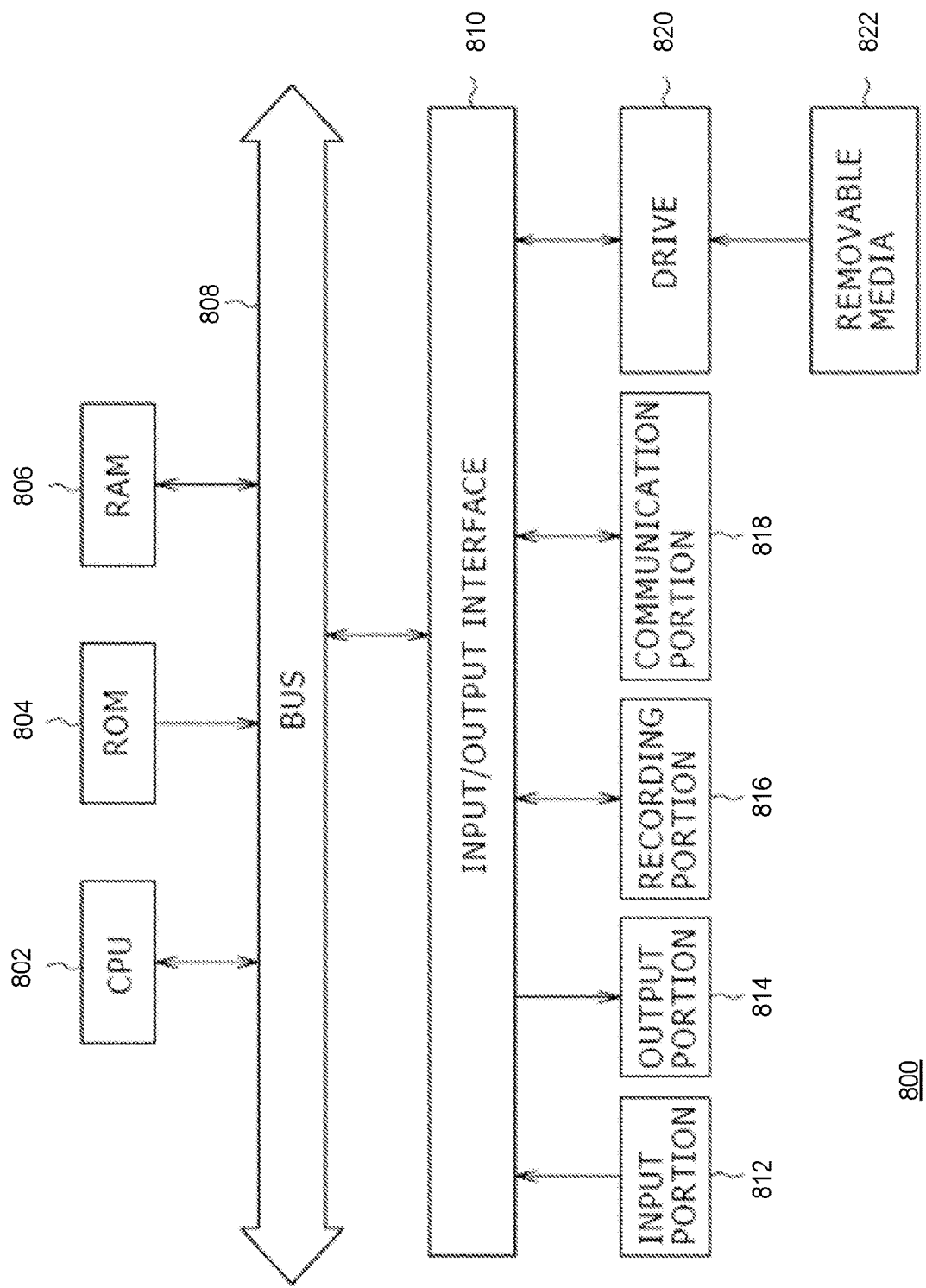
FIG. 8 is a block diagram showing an example of a hardware configuration of a computer.

FIG. 8 is a block diagram showing an example of a hardware configuration of a computer that can be configured to perform functions of any one or a combination of the reception apparatus 20 and information providing apparatus 352. For example, in one embodiment, the computer is configured to perform the functions in the digital domain, such as the modulator, channel encoder, demodulator, and the transmitter.

As illustrated in FIG. 8 the computer includes a CPU 802, ROM (read only memory) 804, and a RAM (random access memory) 806 interconnected to each other via one or more buses 808. The one or more buses 808 are further connected with an input-output interface 810. The input-output interface 810 is connected with an input portion 812 formed by a keyboard, a mouse, a microphone, remote controller, etc. The input-output interface 810 is also connected an output portion 814 formed by an audio interface, video interface, display, speaker and the like; a recording portion 816 formed by a hard disk, a non-volatile memory or other non-transitory computer readable storage medium; a communication portion 818 formed by a network interface, modem, USB interface, fire wire interface, etc.; and a drive 820 for driving removable media 822 such as a magnetic disk, an optical disk, a magneto-optical disk, a semiconductor memory, etc.

According to one embodiment, the CPU 802 loads a program stored in the recording portion 816 into the RAM 806 via the input-output interface 810 and the bus 808, and then executes a program configured to provide the functionality of the one or combination of the information providing apparatus 352 illustrated in FIG. 3 or the reception apparatus 102 illustrated in FIG. 2A.

The hardware description above, exemplified by any one of the structure examples shown in FIGS. 2A and 3, constitutes or includes specialized corresponding structure that is programmed or configured to perform the algorithms shown for example in FIGS. 4 and 5. For example, the algorithm shown in FIGS. 4 and/or 5 may be completely performed by the circuitry included in the reception apparatus 20 shown in FIG. 2A.

A system that includes the features in the foregoing description provides numerous advantages. In particular, the methodologies described herein may be employed to signal whether the same or equivalent content is contained in a plurality of services, and selection between those services.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present disclosure. As will be understood by those skilled in the art, the present invention may be embodied in other specific forms without departing from the spirit or essential characteristics thereof. Accordingly, the disclosure of the present invention is intended to be illustrative, but not limiting of the scope of the present disclosure, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below.

(1) A reception apparatus, including circuitry configured to receive first service information for a first service included in a first broadcast stream, the first service being associated with a first virtual channel number; receive second service information for a second service included in a second broadcast stream, the second service being associated with a second virtual channel number; and determine whether the first service included in the first broadcast stream contains the same programming content as a service included in another broadcast stream based on the first service information, in which the first service information includes an identifier included in the second service information when the first service included in the first broadcast stream contains the same programming content as the second service included in the second broadcast stream.

(2) The reception apparatus according to feature (1), in which the first service information is included in the first broadcast stream, and the second service information is included in the second broadcast stream.

(3) The reception apparatus according to feature (1) or (2), in which the first service information includes a transport stream identifier of a broadcast emission carrying the second broadcast stream.

(4) The reception apparatus according to any of features (1) to (3), in which the circuitry is configured to receive a user input corresponding to a virtual channel selection, and determine whether the first service included in the first broadcast stream contains the same programming content as the second service included in the second broadcast stream based on the first service information and the second service information when a virtual channel corresponding to the virtual channel selection is associated with the first virtual channel number and the second virtual channel number.

(5) The reception apparatus according to any of features (1) to (4), in which the circuitry is configured to select the first service included in the first broadcast stream for display when the second service included in the second broadcast stream is determined to contain the same programming content as the first service included in the first broadcast stream.

(6) The reception apparatus according to any of features (1) to (5), in w which the circuitry is configured to receive the first broadcast stream which is transmitted according to a first broadcast standard; and receive the second broadcast stream which is transmitted according to a second broadcast standard, which is different from the first broadcast standard.

(7) The reception apparatus according to any of features (1) to (6), in which the circuitry is configured to extract the first service information from a service list table (SLT) included in the first broadcast stream, the SLT including information about each of the one or more services included in the broadcast stream, and extract the second service information from Program Specific Information (PSI) included in the second broadcast stream.

(8) The reception apparatus according to any of features (1) to (7), in which the circuitry is configured to extract the service information from service guide data included in the first broadcast stream, the service guide data including a description of the available services or content included in the first broadcast stream, and extract the second service information from Program Specific Information (PSI) included in the second broadcast stream.

(9) The reception apparatus according to any of features (1) to (8), further including a display panel, in which the circuitry includes at least one digital television receiver that is configured to receive the first and second broadcast streams.

(10) A method of a reception apparatus for identifying services containing the same programming content, the method includes receiving, by circuitry of the reception apparatus, first service information for a first service included in a first broadcast stream, the first service being associated with a first virtual channel number; receiving, by the circuitry, second service information for a second service included in a second broadcast stream, the second service being associated with a second virtual channel number; and determining, by the circuitry, whether the first service included in the first broadcast stream contains the same programming content as a service included in another broadcast stream based on the first service information, in which the first service information includes an identifier included in the second service information when the first service included in the first broadcast stream contains the same programming content as the second service included in the second broadcast stream.

(11) The method according to feature (10), in which the first service information is included in the first broadcast stream, and the second service information is included in the second broadcast stream.

(12) The method according to feature (10) or (11), in which the service information is a transport stream identifier of a broadcast emission carrying the second broadcast stream.

(13) The method according to any of features (10) to (12), further including receiving a user input corresponding to a virtual channel selection, in which the step of determining includes determining whether the first service included in the first broadcast stream contains the same programming content as the second service included in the second broadcast stream based on the first service information and the second service information when a virtual channel corresponding to the virtual channel selection is associated with the first virtual channel number and the second virtual channel number.

(14) The method according to any of features (10) to (13), further including selecting the first service included in the first broadcast stream for display when the second service included in the second broadcast stream is determined to contain the same programming content as the first service included in the first broadcast stream.

(15) The method according to any of features (10) to (14), in which the first broadcast stream is transmitted according to a first broadcast standard, and the second broadcast stream is transmitted according to a second broadcast standard, which is different from the first broadcast standard.

(16) The method according to any of features (10) to (14), further including extracting the first service information from a service list table (SLT) included in the first broadcast stream, the SLT including information about each of the one or more services included in the broadcast stream; and extracting the second service information from Program Specific Information (PSI) included in the second broadcast stream.

(17) The method according to any of features (10) to (15), further including extracting the service information from service guide data included in the first broadcast stream, the service guide data including a description of the available services or content included in the first broadcast stream; and extracting the second service information from Program Specific Information (PSI) included in the second broadcast stream.

(18) A non-transitory computer-readable medium storing instructions which when executed by a computer cause the computer to perform a method for identifying services containing the same programming content according to any of features (10) to (17).

The invention claimed is:

1. A method of a reception apparatus, the method comprising:
receiving a first broadcast emission corresponding to a first broadcast service;
receiving a second broadcast emission including a low level signaling (LLS), the second broadcast emission corresponding to a second broadcast service;
extracting a service list table (SLT) from the LLS, the SLT comprising, in an element describing the second broadcast service, a value identifying the first broadcast emission as carrying the same programming content as is being broadcast in the second broadcast service;

building a list of services that the reception apparatus can receive; and outputting the first broadcast service or the second broadcast service.

2. The method according to claim 1, wherein the value is a 16-bit number that represents a Transport Stream Identifier (TSID) value identifying the first broadcast emission.

3. The method according to claim 1, wherein the element describing the second broadcast service in which the value is included is a service fragment of the SLT.

4. The method according to claim 1, wherein the SLT further includes bootstrap information used by the reception apparatus to discover service layer signaling (SLS) for each service.

5. The method according to claim 1, wherein the SLT includes characteristics corresponding to each of a plurality of services that the reception apparatus can receive and the building the list of services is performed by the circuitry based on the characteristics in the SLT.

6. The method according to claim 5, wherein characteristics corresponding to at least one of the services that the reception apparatus can receive include the value identifying the first broadcast emission carrying the same programming as the respective one of the services.

7. The method according to claim 1, wherein the first broadcast emission is an Advanced Television Systems Committee (ATSC) 1.0 broadcast emission and the second broadcast emission is an ATSC 3.0 broadcast emission.

8. The method according to claim 1, wherein the method further comprises recording at least one of the first broadcast service or the second broadcast service.

9. The method according to claim 1 comprising displaying at least one of the first broadcast service or the second broadcast service.

10. A reception apparatus comprising:
circuitry configured to:
receive a first broadcast emission corresponding to a first broadcast service, and a second broadcast emission including a low level signaling (LLS), the second broadcast emission corresponding to a second broadcast service,
extract a service list table (SLT) from the LLS, the SLT comprising, in an element describing the second broadcast service, a value identifying the first broadcast emission as carrying the same programming content as is being broadcast in the second broadcast service,
build a list of services that the reception apparatus can receive, and
output the first broadcast service or the second broadcast service.

11. The apparatus according to claim 10, wherein the value is a 16-bit number that represents a Transport Stream Identifier (TSID) value identifying the first broadcast emission.

12. The apparatus according to claim 10, wherein the element describing the second broadcast service in which the value is included is a service fragment of the SLT.

13. The apparatus according to claim 10, wherein the SLT further includes bootstrap information used by the reception apparatus to discover service layer signaling (SLS) for each service.

14. The apparatus according to claim 10, wherein the SLT includes characteristics corresponding to each of a plurality of services that the reception apparatus can receive and the building the list of services is performed by the circuitry based on the characteristics in the SLT.

15. The apparatus according to claim 14, wherein characteristics corresponding to at least one of the services that the reception apparatus can receive include the value identifying the first broadcast emission carrying the same programming as the respective one of the services.

16. The apparatus according to claim 10, wherein the first broadcast emission is an Advanced Television Systems Committee (ATSC) 1.0 broadcast emission and the second broadcast emission is an ATSC 3.0 broadcast emission.

17. The apparatus according to claim 10, wherein the circuitry is configured to record at least one of the first broadcast service or the second broadcast service.

18. The apparatus according to claim 10 comprising a display configured to display at least one of the first broadcast service or the second broadcast service.

19. A non-transitory computer-readable storage medium storing computer-readable instructions thereon, which, when executed by a reception apparatus, cause the reception apparatus to perform a method comprising:
receiving a first broadcast emission corresponding to a first broadcast service;
receiving a second broadcast emission including a low level signaling (LLS), the second broadcast emission corresponding to a second broadcast service;
extracting a service list table (SLT) from the LLS, the SLT comprising, in an element describing the second broadcast service, a value identifying the first broadcast emission as carrying the same programming content as is being broadcast in the second broadcast service;
building a list of services that the reception apparatus can receive; and
outputting the first broadcast service or the second broadcast service.

20. The non-transitory computer-readable storage medium according to claim 19, wherein the first broadcast emission is an Advanced Television Systems Committee (ATSC) 1.0 broadcast emission and the second broadcast emission is an ATSC 3.0 broadcast emission.

* * * * *